United States Patent
Kupka

(10) Patent No.: US 6,659,153 B1
(45) Date of Patent: Dec. 9, 2003

(54) DEVICE AND METHOD FOR PUTTING MOTOR VEHICLE TIRES ONTO RIMS OF DISK WHEELS

(75) Inventor: Heinz Kupka, Hemsbach (DE)

(73) Assignee: Hofmann Maschinen-und Anlagenbau GmbH (DE)

( * ) Notice: Subject to any disclaimer, the term of this patent is extended or adjusted under 35 U.S.C. 154(b) by 0 days.

(21) Appl. No.: 10/151,128

(22) Filed: May 17, 2002

(51) Int. Cl.[7] .................................. B60C 25/135
(52) U.S. Cl. .................... 157/1.24; 157/1.17; 157/1.1
(58) Field of Search ................. 157/1.1, 1.17, 157/1.2, 1.24, 1.3; 318/430–434, 362, 373–375, 379

(56) References Cited

U.S. PATENT DOCUMENTS

| | | | | |
|---|---|---|---|---|
| 4,694,875 A | * | 9/1987 | Goebel | 157/1.24 |
| 4,986,328 A | * | 1/1991 | Metzger | 157/1.24 |
| 5,196,772 A | * | 3/1993 | Kupka et al. | 318/434 |
| 6,227,277 B1 | * | 5/2001 | Corghi | 157/1.24 |

FOREIGN PATENT DOCUMENTS

| | | | |
|---|---|---|---|
| DE | 3711153 | 10/1987 | |
| DE | 4028080 | 3/1992 | |
| DE | 4111804 | 10/1992 | |
| DE | 4327951 | 2/1995 | |
| EP | 1247661 A2 | * 10/2002 | ......... B60C/25/132 |

OTHER PUBLICATIONS

German Search Report.

* cited by examiner

*Primary Examiner*—George Nguyen
*Assistant Examiner*—David B. Thomas
(74) *Attorney, Agent, or Firm*—Ostrolenk, Faber, Gerb & Soffen, LLP

(57) ABSTRACT

The invention relates to a device and a method for fitting motor vehicle tires onto rims of disk wheels having a tire fitting tool (17) which can rotate about an axis and is mounted at a distance from the axis, an electric motor (2) as a drive motor for a rotational drive of the tire fitting tool (17) about the axis and a power supply device for the drive motor, the power supply device being connected to a gradient-limiting device which, when a predefined gradient of the torque transmitted from the drive motor (2) to the tire fitting tool (17) is exceeded, causes a braking current for stopping the rotational drive to be supplied to the drive motor (2). With the gradient as switch-off criterion, switching off takes place significantly before the limiting value of the torque or of the motor current is reached, so that the tire is handled more gently and it is ensured that the tire is not damaged by the interrupted fitting procedure.

15 Claims, 5 Drawing Sheets

DEVICE AND METHOD FOR PUTTING MOTOR VEHICLE TIRES ONTO RIMS OF DISK WHEELS

BACKGROUND OF THE INVENTION

The invention relates to a device and a method for fitting motor vehicle tires on rims of disk wheels having the features of the preamble of patent claims 1 and 14.

In such an automatic tire mounting and inflating system, the mounting tool is mounted, for example in the form of two tire fitting rollers and a tire guide roller on a single-armed fitting head. The radial and axial spacing of the fitting head can be adjusted as a function of the type of motor vehicle tire and is embodied so that it can be lowered into a working position. The fitting tool can be composed here of two tire fitting rollers and a tire guide roller. Using an electric motor, the tire fitting tool is turned on the single-armed fitting head about an axis (360° rotational movement), permitting fitting to be carried out at a distance from the disk wheel.

Using an electronic torque sensor, a control of the fitting procedure and a display on a pointer instrument are obtained. By means of a light display, upward transgression of a preset maximum permissible torque can be indicated so that a further control can be provided on the mounted tire after such a fitting procedure.

In addition, DE 28 29 935 A1 discloses a device for fitting motor vehicle tires onto rims of disk wheels in which tire fitting tools which can rotate about an axis and are mounted at a distance from the axis are provided, said tire fitting tools being driven and rotated about the respective disk wheel axis during the fitting procedure by means of a drive.

DE 40 28 080 C2 discloses a device and a method of the type mentioned at the beginning, a power supply device being connected to a torque limiting device which, when a predefined torque (torque threshold value) transmitted to the tire fitting tool by the drive motor is exceeded, causes a braking current for stopping the rotational drive to be supplied to the drive motor. A desired torque limitation and thus the objective of achieving gentle handling of the tire during the fitting operation is achieved by supplying power to the drive with torque monitoring. When a preselected drive torque is exceeded as limiting value, the drive brakes in order to avoid damaging the tire.

In the aforesaid limiting value method, the actual switch-off torque is determined by the braking time which is difficult to control, and which is thus an essential determining factor in the damage to the tire. This leads to the problem that the tire itself can still be damaged owing to the braking time even when the fitting procedure is interrupted.

BRIEF SUMMARY OF THE INVENTION

An object of the present invention is therefore to provide a device and a method of the type mentioned at the beginning by means of which more gentle handling of the tire can be ensured.

This object is achieved by means of the measures disclosed in patent claims 1 and 14.

In the invention, the gradient of the torque profile is used as switch-off criterion so that switching off can be achieved significantly before the limiting value of the torque or of the motor current is reached. As a result, the tire is handled more gently and it is ensured that the tire is not damaged by the interrupted fitting procedure. The problem of the braking time which is difficult to control in the limiting value method can thus be avoided.

The power supply device can preferably have a current-conducting device and a torque controller, via which the supply current is supplied to the drive motor, and the gradient-limiting device can be connected to the torque controller in such a way that, when the predefined gradient is exceeded, the controlled variable supplied to the torque controller for the set point torque is set to zero. As a result, simple switching off by means of the set point torque is possible.

In order to improve the starting torque and braking torque, the device can be configured in such a way that when the drive motor is accelerated, an additional electrical reference current is fed to the controller via a closed switching device in the current-conducting device, the signal which corresponds to the set point rotational speed of the drive motor being fed, as controlled variable, to the controller; that, when the set point rotational speed is reached or at the set point rotational speed the switching device in the current-conducting device which supplies the reference variable is opened; and in that when braking occurs the signal which is fed as controlled variable to the torque controller and is proportional to the set point rotational speed is set to zero and the additional reference current is fed to the controller by closing the switching device in the power supply device. An increased reference current is thus supplied during starting up and during braking of the drive.

The gradient-limiting device can have a calculation device for determining the gradient of the torque profile by means of differential quotient formation. Here, a rotational angle signal generator can be provided for sensing the rotational angle of the fitting tool about the axis, the differential quotient being formed with respect to the sensed rotational angle.

As an alternative exemplary embodiment, the calculation device can be configured to form the differential quotient with respect to time. The differential quotient can be carried out by means of torque values and rotational angle values or time values stored in a data store. The output signal of a rotational speed measuring device or the current supplied to the drive motor can be used as torque value. In order to improve the reliability, upward transgression of the predefined gradient for a predetermined percentage of the discretized values stored in the data memory can be used as switch-off criterion in the gradient-limiting device. As a result, switching off can be avoided when there are noncritical brief increases in the gradient.

The gradient-limiting device is preferably configured to determine the gradient in predetermined observation intervals. As a result of this measure, switching off can be avoided when the gradient increases which are non-damaging for the tires and which occur, for example, when the fitting tool is started or when there is first contact with the tire. The observation intervals can be selected on a wheel-specific basis.

The invention consequently provides a protection device by means of which more gentle handling of the tire during the fitting procedure is achieved and thus damage owing to the braking time is prevented.

BRIEF DESCRIPTION OF THE SEVERAL VIEWS OF THE DRAWINGS

The invention will be explained in more detail below by means of exemplary embodiments and with reference to the figures in the drawing, of which.

DETAILED DESCRIPTION OF THE INVENTION

Figure 1:
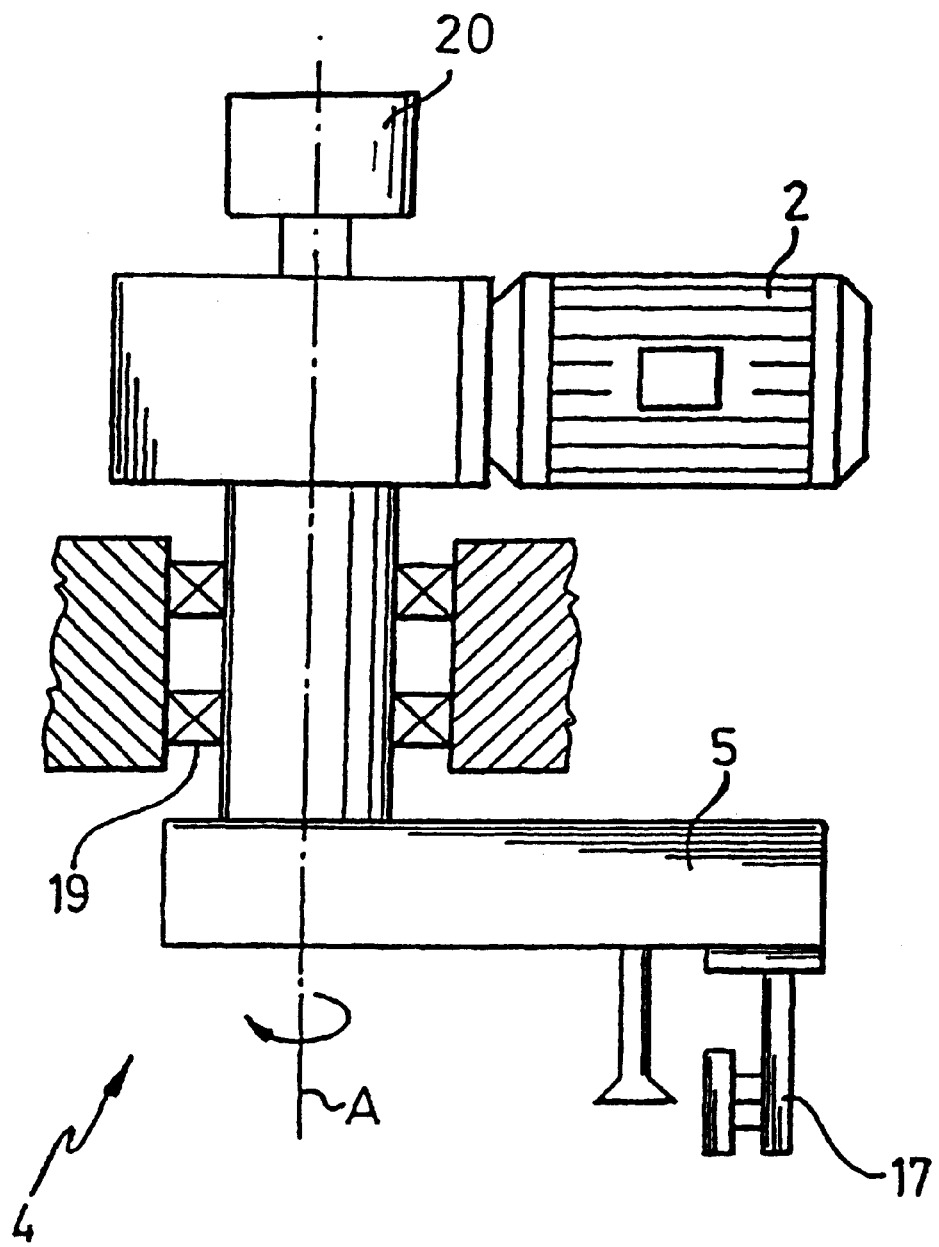
FIG. 1 shows an exemplary embodiment of a fitting head which can be applied in the invention.

FIG. 1 is a schematic illustration of an exemplary embodiment of a fitting head 4 which can be applied in the invention. This fitting head 4 essentially comprises a fitting tool 17 which can be mounted in a bearing 19 so as to be rotatable about an axis A. The fitting tool 17 is at a distance from the axis A, it being possible to set this distance as a function of the tire and/or rim diameter of the disk wheel which on which the tire is to be fitted. For this purpose, the fitting tool 17 is mounted on a fitting arm 5 which extends perpendicularly to the axis A. The rotational drive, necessary for the fitting procedure, for the fitting tool 17 is supplied by a drive motor 2, in particular electric motor. This is preferably a servo motor, for example a three-phase servo motor. However, a DC servo motor can also be used. This fitting head can be used in a known fashion in a mounting station of an automatic tire mounting system which has been known for automatic tire mounting and inflation systems.

According to a first example of the embodiment, the fitting head 4 can be equipped with an angle incremental signal generator 20 which senses the instantaneous rotational angle of the fitting tool 17 about the axis A as a discrete measured value. The angle incremental signal generator can be embodied as a resistance angle sensor, inductive angle sensor, rotary resolver, magnetic angle sensor, angle sensor with Hall probe and field plates or the like. The discretization can be achieved directly in the angle sensor or by subsequent quantization. By means of the output signal of the angle incremental signal generator 20, discrete angle measured values are made available which can be used to determine the gradient of the torque profile, for example by forming a differential quotient on the basis of a sensed measurement signal corresponding to the torque.

Figure 2:
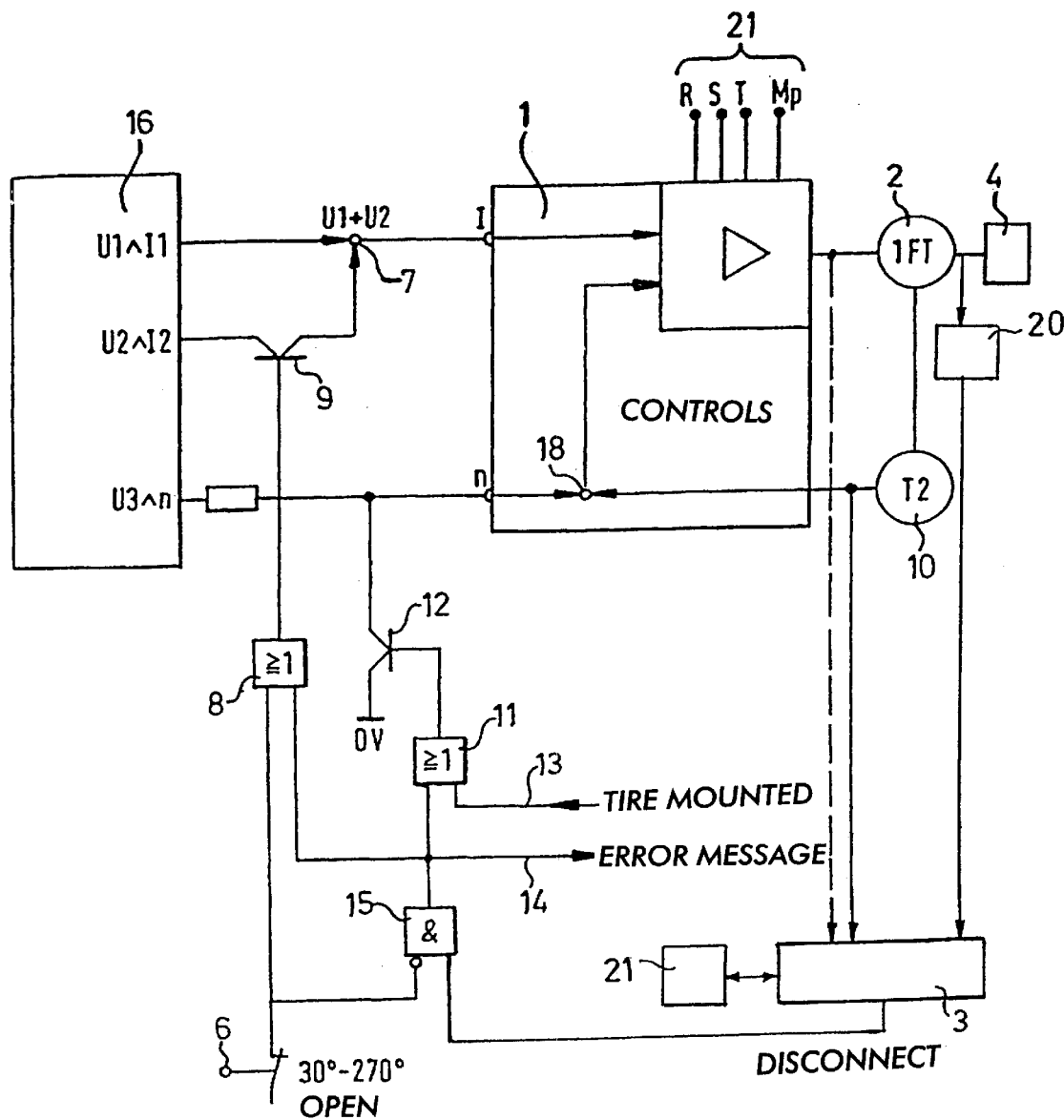
FIG. 2 shows a block circuit diagram of exemplary embodiments of the torque limiting device and power supply device which are applied in the invention.

FIG. 2 shows a block circuit diagram of a power supply device and a gradient-limiting device which are connected to the drive motor 2. According to FIG. 2, the power supply device for the drive motor 2 contains, as essential components, a controller which is connected to a three-phase supply source 21 and acts as a torque controller 1, and a reference variable signal generator 16 for supplying programmed output voltages U1 and U2 for the torque control as well as an output voltage U3 which is supplied as controlled variable to the torque controller 1. In addition, the power supply device contains a switching device 9 which is preferably embodied as the transistor, and a summing circuit 7, in which reference currents I1 and I2 which are supplied at the outputs U1, U2 of the reference variable signal generator or signal generator 16 and which are fed as reference variable to the input I of the torque controller 1 are summed during the acceleration and braking of the motor, as explained below. The summing circuit 7, the switching device 9 and the signal generator 16 (reference variable signal generator) form a current-conducting device. In addition, a comparator 18 to which the controlled variable and an actual value are supplied, as will be explained below, are also provided in a known fashion in the torque controller 1.

The drive motor 2 is connected to the output of the torque controller 1, said drive motor 2 supplying, as was explained with reference to FIG. 1, the necessary torque for the fitting head 4 during the fitting procedure of a tire onto the rim of a disk wheel.

The gradient-limiting device contains a calculation device 3, for example a microprocessor, a microcomputer or the like and a data store 21 for storing discrete measured values. The calculation device 3 is supplied with the discrete rotational angle values determined by the angle incremental signal generator 20. In addition, the calculation device 3 is supplied with an output signal of a tacho generator which forms a rotational speed measuring device 10 which is connected to the drive motor 2. The discretization of the supplied measured values can also be carried out by means of an analog/digital converter in the calculation device 3. The discrete measured values which are determined can be processed directly or buffered by the calculation device 3 in the data store 21 and used for differential quotient formation. If a switch-off criterion which relates to the gradient profile is fulfilled, the calculation device 3 transmits a corresponding switch-off signal to an OR circuit 11 via an AND circuit 15. The output of the OR circuit 11 controls the base of a transistor 12 which [lacuna] a switching device which acts on the reference variable at the output U3 of the signal generator 16, as will be explained below.

The second input of the AND circuit 15 is connected to a switch 6. The output of the AND circuit 15 and a contact of the switch 6 are connected to the two inputs of a further OR circuit 8. The output of this OR circuit 8 is connected to the base of the transistor which forms the switching device 9 in the current-conducting device.

The method of operation of the circuit arrangement illustrated in FIG. 2 in conjunction with the drive motor 2 is as follows:

After the fitting head 4 illustrated in FIG. 1 has been fitted onto the tire to be mounted, the voltages which are to be supplied at the outputs U1, U2 and U3 are made available by the reference variable signal generator 16. In addition, the switch 6 is actuated so that the switching device 9 which is embodied as a transistor is switched on. As a result, reference currents I1 and I2 which are supplied both by the output U1 and by the output U2 are summed in the summing circuit 7 to form an increased reference current. This increased reference current is supplied to the torque controller 1 via the input 1 in order to accelerate the drive motor 2. The drive motor 2 accelerates to a set point rotational speed which is fed as a controlled variable to the input n of the torque controller 1 by the signal, supplied at the output U3 of the reference variable signal generator 16. The rotational speed measuring device 2, which supplies at its output an electrical signal which is proportional to the actual rotational speed, is connected to the drive motor 2. This signal is supplied as an actual value to the comparator 18 in the torque controller or rotational speed controller 1. In this way, the necessary continuous control function is carried out and the motor rotates with the desired set point rotational speed.

After the fitting head 4 has been pivoted within a certain angular range, for example of approximately 20 to 30° at the start of the fitting procedure, the switch 6 is opened. As a result, the switching device 9 is switched off so that the drive motor 2 is only then supplied by the supply source 21 via the controller as a function of the reduced reference current I1.

As a result, the gradient-limiting device which acts as a safety device is simultaneously actuated. As FIG. 2 shows, the rotational-speed-proportional output signal of the rotational speed measuring device 10 and the output of the angle incremental signal generator 20 are supplied to the inputs of the calculation device 3. The calculation device 3 has been programmed to a predetermined gradient threshold value which determines the switch-off criterion. During the fitting procedure, the calculation device 3 can continuously store the sensed discretized instantaneous values of the rotational-speed-proportional output signal of the rotational speed measuring device 10 and the angle signal of the angle incremental signal generator 20 in the data store 21 and continuously calculates the instantaneous differential quotients $\Delta M/\Delta\phi$. As an alternative, instead of the use of the angle incremental signal generator 20 it is also possible to determine the differential quotient with respect to time, the discrete torque values being stored with respect to the associated time values in the data store 21.

Figure 3A:
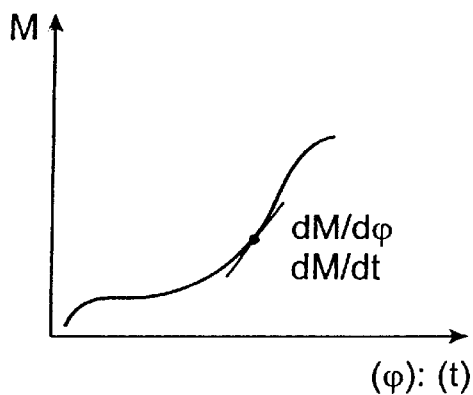
FIGS. 3a, 3b show a torque profile with indicated differential quotient and a current profile with indicated differential quotient.

FIG. 3A shows a diagram with a torque profile which has been determined by means of the output signal of the rotational speed measuring device 10 and has been plotted against the rotational angle or time. In the diagram, the gradient of a tangent at a point P corresponds to the differential quotients d/M$\phi$ or dM/dt, respectively. This differential quotient corresponds in theory to the gradient of the torque for the angle coordinate or time coordinate of the point P. In the technical implementation in the device according to the invention, the gradient is approximated by a differential quotient formation $\Delta M/\Delta\phi$ and $\Delta M/\Delta t$, respectively, as the torque profiles are in discretized form and the rotational angle is also measured in a discrete fashion by means of the rotational angle incremental signal generator 20. The same also applies to the alternative measurement of the time t.

As an alternative exemplary embodiment, the torque profile can also be determined by means of the current supplied to the drive motor 2, as indicated in FIG. 2 by the dashed measuring supply line to the calculation device 3. The measurement of current can be carried out by a resistance network, an ammeter or the like, the measurement signal being supplied to the calculation device 3 in discretized form or it being possible for the discretization to take place in the calculation device 3. The discretized current measured values can then be stored in the data store 21 as an alternative to the rotational speed measured values.

Figure 3B:
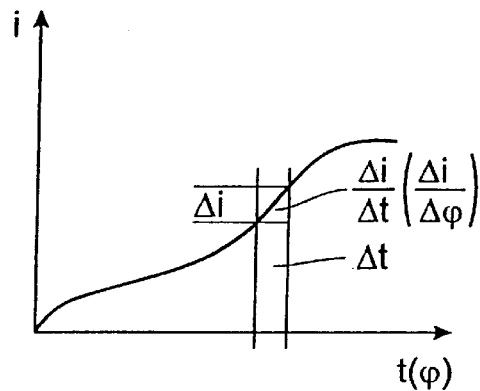

FIG. 3B shows a current profile over time t and an exemplary differential quotient formation $\Delta i/\Delta t$, such as is carried out, for example, for discrete measured values in the calculation device 3.

If an excessively increased gradient of the torque profile is detected between the fitting tool 17 and the output shaft of the drive motor 2 during the fitting procedure owing to the changing output signal of the rotational speed measuring device 10 or the current measuring device as a result of the differential quotient formation in the calculation device 3, the calculation device 3 supplies a switch-off signal which drives the base of the transistor 12 via the AND circuit 15 and the OR circuit 11, as a result of which the transistor connected to ground is switched on and thus the switching device formed by the transistor 12 is switched on. As a result, the controlled variable which is fed to the input n of the controller 1 is adjusted to zero.

At the same time, the switch-off signal of the calculation device 3 drives, via the AND circuit 5 and the OR circuit 8, the base of the transistor which forms the switching device 9 in the power supply device. As a result, the switching device 9 is switched on and an additional reference current I2 is supplied to the summing circuit 7, as was already the case when the drive motor 2 was accelerated. Since the controlled variable which is fed to the input of the controller 1 is adjusted to zero, as has already been explained, the increased reference current I1+I2 brings about an increased braking current so that the drive motor 2 is braked hard and can be brought to a standstill with little running on. In this way, limitation dependent on the gradient of the torque, and thus gentle handling of the tire during the fitting procedure are achieved.

As is also apparent from FIG. 2, it is possible to output a fault message in the form of an alarm or a light signal via a line 14 when the calculation device 3 outputs the switch-off signal.

When the tire fitting procedure occurs normally, the switch 6 is closed after the rotational angle, for example 270°, necessary for the fitting procedure has been reached and in addition a signal "tire fitted" is supplied to the input of the OR circuit 11 via a control line 13. As a result, the transistor which forms the switching device 12 is placed in the conductive state. As a result, as already explained, the controlled variable supplied in the input n of the controller 1 is adjusted to zero.

As the switching device 9 formed by the transistor in the power supply device is also switched on by the closed switch 6 by means of the OR circuit 8, the additional supply current I2 is added to the reference current I1 so that an increased braking current is supplied for braking the drive motor 2. In this way, the drive motor 2 is stopped during a normal fitting procedure.

Figure 4:
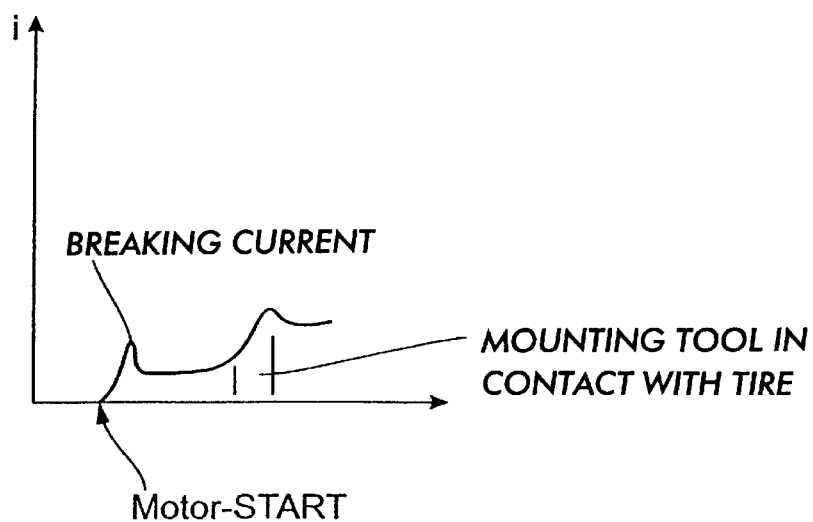
FIG. 4 shows a current profile for the starting operation of the fitting tool.

In practice, with the device according to the invention it becomes apparent that the critical limiting value for the gradient of the torque profile can already be exceeded without a situation which is dangerous for the tire occurring. This is apparent, for example, in the torque profile shown in FIG. 4 for the start of the fitting procedure. If the sensed motor current is used to determine the gradient, the "brake-away current" which occurs at the start of the drive motor 2 can lead to the limiting value for the gradient being exceeded. A similar problem occurs at the time when the fitting tool 14 is first in contact with the tire during the rotation. In order that switching off owing to an incorrect interpretation does not take place in these cases, the evaluation or determination of the differential quotient in the calculation device 3 is performed only at specific suitable observation intervals. These observation intervals can be selected or programmed on a wheel-specific basis. Depending on the exemplary embodiment used, the observation intervals can be determined as a function of the sensed rotational angle or time profile of the fitting procedure.

A further problem is experienced due to the fact that brief increases in gradient can also occur in the suitable observation intervals and can therefore not be avoided by the above-mentioned interval selection method. An incorrect interpretation and incorrect switching off which results from this can be avoided by reading a time sequence of measured values into the data memory 21 and subsequently evaluating them. The amount of this data of the evaluated sequence in which the permitted gradient or differential quotient was exceeded is determined here. For example, it may still be permissible for the limiting value to be exceeded for 10% of the data, whereas more than, for example, 20% of the data being exceeded constitutes a switch-off criterion.

Figure 5:
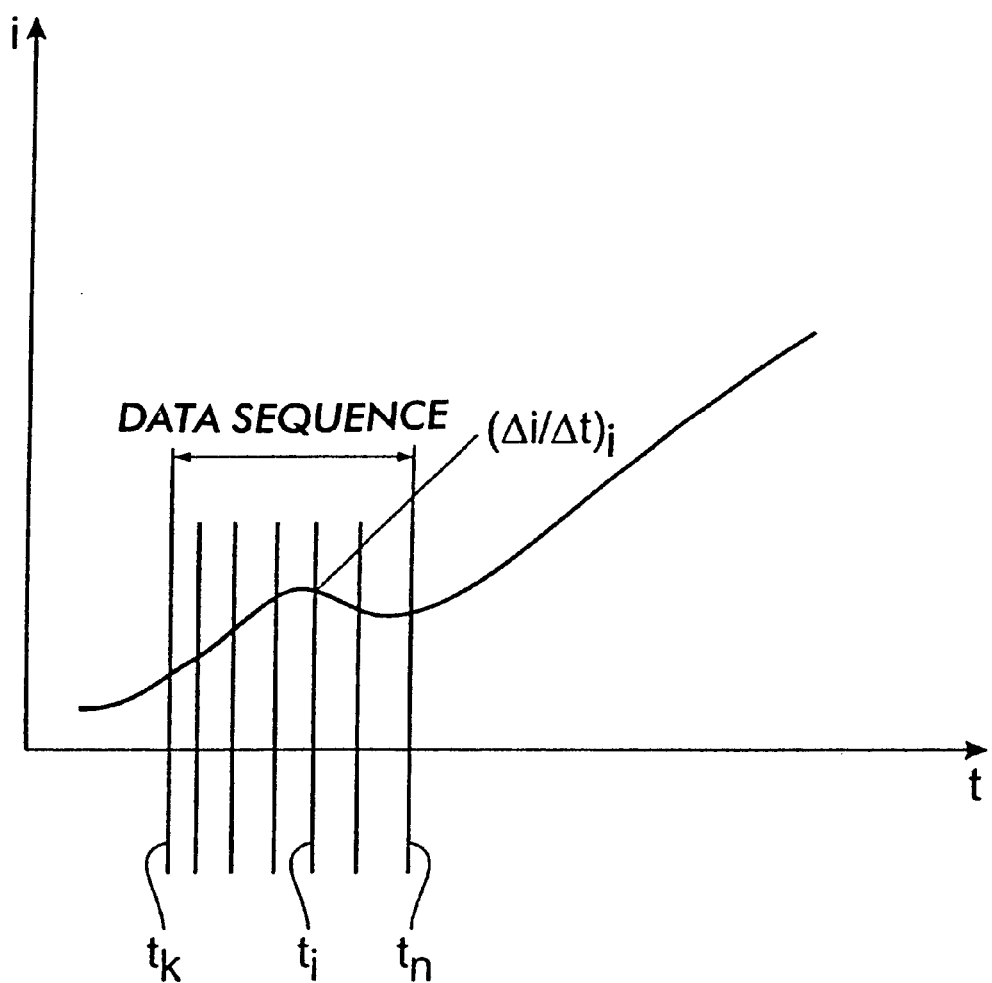
FIG. 5 shows a current profile with a discretized data sequence.

FIG. 5 shows a time-dependent current profile with a data sequence which corresponds to the discrete sensed current values for points in time $t_k$ to $t_n$, the differential quotient $(\Delta i/\Delta t)_i$ being indicated at the time $t_i$. For each of these points in time $t_k$ to $t_n$ of the data sequence, the differential quotient is formed and the percentage of the upward transgressions determined. By means of this measure it is possible to avoid incorrect switching off when there are non-critical brief increases in the gradient.

Figure 6:
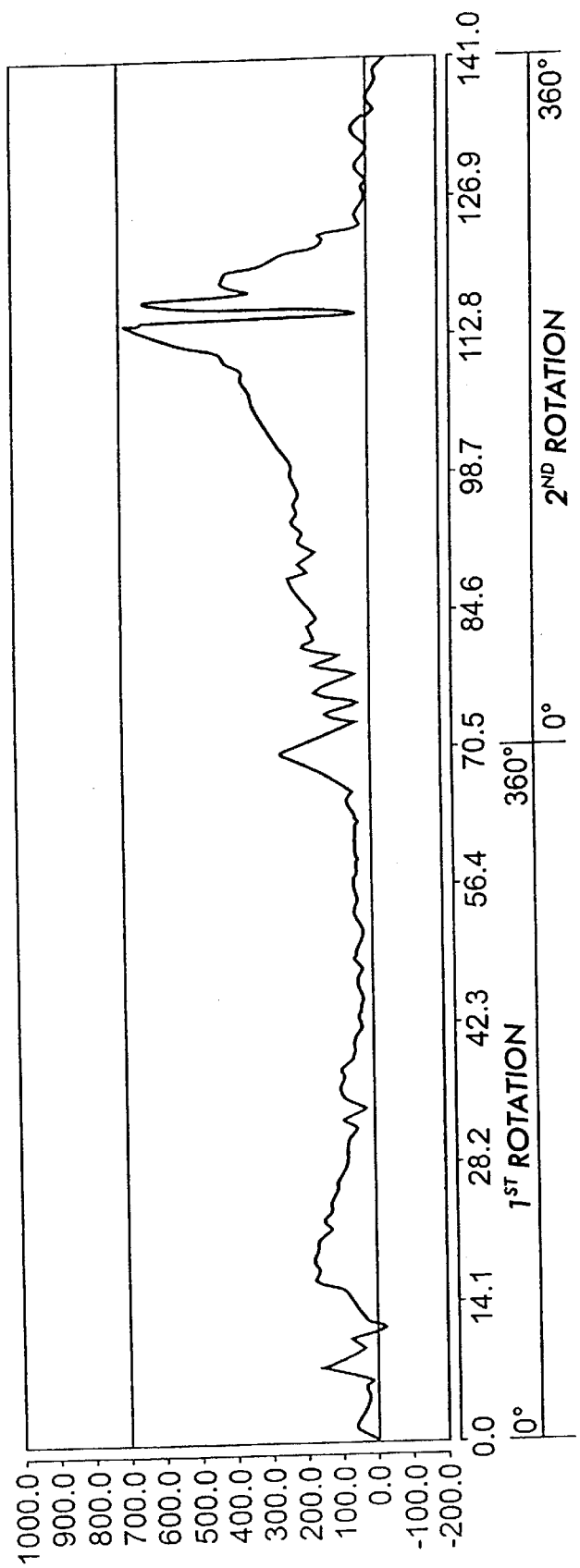
FIG. 6 shows a measured profile of the torque according to a practical example.

FIG. 6 shows a measurement record of the torque profile obtained by an actual measurement during the fitting of a motor vehicle tire. In particular, the illustration shows two revolutions of the fitting tool 17, the first revolution with the smaller torque values corresponding to the fitting of the lower tire bead and the second revolution with the critical torque profiles corresponding to the fitting of the upper tire bead. It is apparent in the illustration that a critical gradient is to be evaluated as a switch-off criterion only if it is present for a specific time.

A low-inertia electric motor should preferably be used as the drive motor 2, so that an increase in torque during the fitting procedure is immediately apparent as a drop in the torque which is sensed by the rotational speed measuring device 10, if this is used to determine the torque profile. Servo motors are preferably used and can be embodied as three-phase servo motors, for example synchronous or asynchronous machines, or as DC servo motors.

If the current supplied to the drive motor is used to determine the torque profile, the use of DC servo motors is preferred, as the armature current which is increased when the drive motor 2 is loaded can then be sampled in the form of a voltage drop in the armature circuit and can be evaluated in the calculation device 3.

What is claimed is:

1. A device for fitting motor vehicle tires on rims of disk wheels having a tire fitting tool which can rotate about an axis and is mounted at a distance from the axis, an electric motor as drive motor for a rotational drive of the tire-fitting tool about the axis and a power supply device for the drive motor, wherein the power supply device (1, 7, 9, 16) is connected to a gradient-limiting device (3, 8, 11–15, 20, 21) which, when a predefined gradient of the torque transmitted to the tire-fitting tool (17) by the drive motor (2) is exceeded, causes a braking current for stopping the rotational drive to be supplied to the drive motor (2).

2. The device as claimed in claim 1, wherein the power supply device (1, 7, 9, 16) has a current-conducting device (7, 9, 10) and a torque controller (1), via which the supply current is fed to the drive motor (2), and the gradient-limiting device (3, 8, 11–15, 20, 21) is connected to the torque controller (1) in such a way that, when the predefined gradient is exceeded, the controlled variable supplied to the torque controller (1) for the set point torque is set to zero.

3. The device as claimed in claim 1, characterized in that when the drive motor (2) is accelerated, an additional electrical reference current (12) is supplied to the controller (1) via a closed switching device (g) in the current-conducting device, a signal (U3) which corresponds to the set point rotational speed of the drive motor (2) being fed to the controller (1);

when the set point rotational speed is reached, or at the set point rotational speed, the switching device (9) in the current-conducting device (7, 9, 16) which supplies the reference variable is opened; and when braking occurs the signal which is fed as controlled variable to the torque controller (1) and is proportional to the set point rotational speed is set to zero and the additional reference current (12) is fed to the controller (1) by closing the switching device (9) in the power supply device (1, 7, 9, 16).

4. The device as claimed claim 1, wherein the gradient-limiting device (3, 8, 11–15, 20, 21) has a calculation device (3) for determining the gradient of the torque profile by means of differential quotient formation.

5. The device as claimed in claim 4, defined by a rotational angle signal generator (20) for sensing the rotational angle of the fitting tool (17) about the axis (A), the differential quotient being formed with respect to the sensed rotational angle.

6. The device as claimed in claim 4, wherein the calculation device (3) is switched off in order to store discretized torque values and rotational angle values in a data store (21), the formation of the differential quotient being carried out by means of the stored torque values and a rotational angle values.

7. The device as claimed in claim 4, wherein the calculation device (3) is configured to form the differential quotient with reference to time.

8. The device as claimed in claim 4, wherein the calculation device (3) is configured to store discretized torque values and time values in a data store (21), the formation of the differential quotient being carried out by means of the stored torque values and time values.

9. The device as claimed in claim 4, wherein the output signal of a rotational speed measuring device (10) is used as torque value.

10. The device as claimed in claim 4, wherein the current which is supplied to the drive motor (2) is used as torque value.

11. The device as claimed in claim 6, wherein upward transgression of the predefined gradient for a predetermined percentage of the discrete values stored in the data store is used as the switch-off criterion in the gradient-limiting device (3, 8, 11–15, 20, 21).

12. The device as claimed in claim 11, wherein the predetermined percentage is 20%.

13. The device as claimed in claim 1, wherein the gradient-limiting device (3, 8, 11–15, 20, 21) is configured to determine the gradient in predetermined observation intervals.

14. A method for fitting motor vehicle tires onto rims of disk wheels having a tire fitting tool which can rotate about an axis and is mounted at a distance from the axis, an electric motor as a drive motor for a rotational drive of the tire fitting tool about the axis and a power supply device for the drive motor, defied by the steps:

determination of the gradient of the torque transmitted by the drive motor to the tire fitting tool (17), and supply of a braking current from the power supply device (21) to the drive motor (2) in order to stop the rotational drive if the determined gradient exceeds a predetermined value.

15. The method as claimed in claim 14, defined by the step of determining the gradient by forming at least one of the differential quotients $\Delta M/\Delta\phi$, $\Delta M/\Delta t$, $\Delta i/\Delta\phi$ and $\Delta i/\Delta t$, $\Delta M$ designating a change in the torque, $\Delta i$ designating a change in the current of the drive motor (2), $\Delta\phi$ designating a corresponding change in the rotational angle of the fitting tool (17) about the axis (A), and $\Delta t$ designating the corresponding change in time.

* * * * *

UNITED STATES PATENT AND TRADEMARK OFFICE
CERTIFICATE OF CORRECTION

PATENT NO. : 6,659,153 B1  Page 1 of 1
DATED : December 9, 2003
INVENTOR(S) : Heinz Kupka It is certified that error appears in the above-identified patent and that said Letters Patent is hereby corrected as shown below:

Title page,
Item [54], Title, change the title to read -- DEVICE AND METHOD FOR FITTING MOTOR VEHICLE TIRES ONTO RIMS OF DISK WHEELS --.

Signed and Sealed this

Twenty-ninth Day of June, 2004

JON W. DUDAS
*Acting Director of the United States Patent and Trademark Office*